United States Patent [19]

Bevilacqua

[11] 4,024,406
[45] May 17, 1977

[54] SPENT FUEL STORAGE IMPROVEMENT

[75] Inventor: Frank Bevilacqua, Windsor, Conn.

[73] Assignee: Combustion Engineering, Inc., Windsor, Conn.

[22] Filed: Feb. 17, 1976

[21] Appl. No.: 658,649

[52] U.S. Cl. .............................. 250/518; 176/30; 176/87; 211/60 R; 250/507

[51] Int. Cl.² .................. G21C 11/00; G21F 5/00

[58] Field of Search ......... 250/506, 507, 515, 518; 176/28, 30, 33, 87; 211/60 R, 60 S

[56] References Cited

UNITED STATES PATENTS

| | | | |
|---|---|---|---|
| 3,379,617 | 4/1968 | Andrews et al. | 211/60 R X |
| 3,665,586 | 5/1972 | Jabsen | 176/87 X |
| 3,667,540 | 6/1972 | Kupp | 250/507 X |
| 3,823,065 | 7/1974 | Jones | 176/87 X |
| 3,845,315 | 10/1974 | Blum | 250/518 X |
| 3,859,533 | 1/1975 | Suvanto | 250/518 X |

*Primary Examiner*—Archie R. Borchelt
*Attorney, Agent, or Firm*—Stephen L. Borst; Richard H. Berneike

[57] ABSTRACT

An apparatus for the safe storage of a plurality of fissionable masses including an array of discrete neutron absorbing shields which utilizes the principle of the neutron trap to reduce the multiplication factor of the storage array to a subcritical value when immersed in a neutron moderating medium. Each discrete neutron absorbing shield is spaced such that the encircled fissionable mass is spaced from the next adjacent neutron absorbing shield by a distance determined by the enrichment of the fissonable masses and attenuation of the moderating medium.

13 Claims, 6 Drawing Figures

SPENT FUEL STORAGE IMPROVEMENT

BACKGROUND OF THE INVENTION

The present invention relates to the safe storage of fissionable masses. More particularly the present invention relates to an apparatus which provides a seismically safe arrangement for storing fissionable masses underwater with a maximum storage density without producing a critical geometry.

FIELD OF THE INVENTION

It is well known to store fissionable masses such as nuclear reactor fuel element assemblies in storage pools which can accommodate either new fuel assemblies or spent fuel assemblies. An essential requirement for all fissionable material storage is that the fissionable material can not be permitted to assume a geometry which is either critical or supercritical. Accordingly, most if not all storage pools have devices and mechanisms for preventing the placing of fissionable masses in such positions that they achieve a critical geometry. However, most prior art fuel storage devices have the disadvantages of occupying large amounts of space in the nuclear power plan and of failing to adequately meet the current nuclear regulatory commission seismic criteria.

DESCRIPTION OF THE PRIOR ART

An example of one such prior art storage arrangement is disclosed in U.S. Pat. No. 3,037,120 issued to J. D. MacDaniels, Jr. on May 29, 1962. Another prior art storage device is described in co-pending application Ser. No. 558,767 by Frank Bevilacqua assigned to the same assignee of this invention. The prior co-pending application not only discloses a new and safe storage device which maximizes the storage density of spent nuclear fuel assemblies but also describes a prior art storage device which was previously known and used. As mentioned, the described prior art appparatus had the fundamental difficiency that it could not easily meet the seismic criteria established by the NRC. While the invention of the prior filed co-pending application adequately solved the problems of creating a seismically safe storage apparatus that maximized the storage density, a less expensive and more easily manufactured solution to the problem is desirable.

SUMMARY OF THE INVENTION

Thus is posed the problem of finding an apparatus which permits the compact storage of fissionable masses without creating the possibility of producing a critical geometry while at the same time minimizing construction costs. This object is realized by the present invention through a design which incorporates discrete neutron absorbing shields adapted to parametrically encircle each of the fissionable masses. It is assumed that the fissionable masses have lateral cross-sections which fit within the confines of a polygon. The apparatus comprises a first series of bands aligned in spaced parallel rows, a second series of bands aligned in spaced parallel rows which cross the first series of bands at an angle equal to the angle between two non-parallel sides of the polygon. With this arrangement the first and the second series of spaced crossed bands form a plurality of passage transverse to the first and second series of bands. A plurality of discrete neutron absorbing shields are then positioned in the passages formed by the first and second series of bands and are rigidly fastened to one band of each of the first and second series of bands. In this manner, an inexpensive seismically safe non-critical storage array is created for the storage of spent fuel assemblies. The first and second series of bands are preferably at different elevations to facilitate the manufacture of the storage array. However, the invention includes the possibility that the first and second series of bands are at the same elevation so that they intersect one another. In addition, third and fourth series of crossing bands may be placed at third and fourth elevations to provide further structural rigidity of the storage array. Both the bands and the discrete neutron absorbing shields may consist of stainless steel. In the situation where the nuclear fuel assembly has a square cross section, the discrete neutron absorbing shield also may have a square cross-section and the first and second series of bands may be spaced a distance not smaller than a diameter of the discrete neutron absorbing shield plus a minimum neutron attenuation distance.

DESCRIPTION OF THE DRAWINGS

The present invention may be better understood and its numerous objects and advantages may become apparent to those skilled in the art by reference to the accompanying drawings wherein like reference numerals refer to like elements in the several figures and in which.

DESCRIPTION OF THE PREFERRED EMBODIMENT

Recent decreases in the availability of spent fuel processing plants have created a substantial demand for increased storage facilities. Accordingly, it is desirable to design a storage facility that is able to store the maximum number of fuel assemblies in a given volume. While there exists this demand to store fuel assemblies with a maximum storage density, an all important and overriding requirement is that the storage array must prevent the fissionable masses from achieving a physical geometry which allows the combined mass to become critical. This requirement must be met in all cases and at all costs and, therefore, the spent fuel storage apparatus must prevent the creation of a critical mass even on the occurrence of the most severe seismic disturbance. It should be recognized that it is possible, depending on the fuel enrichment, that the inadvertant displacement of only one fuel assembly is necessary to create a localized critical mass in the storage array. The following preferred embodiment is an apparatus which accomplishes the object of obtaining a maximum storage density while assuring that a critical mass is avoided even on the occurrence of a severe earthquake.

Figure 1:
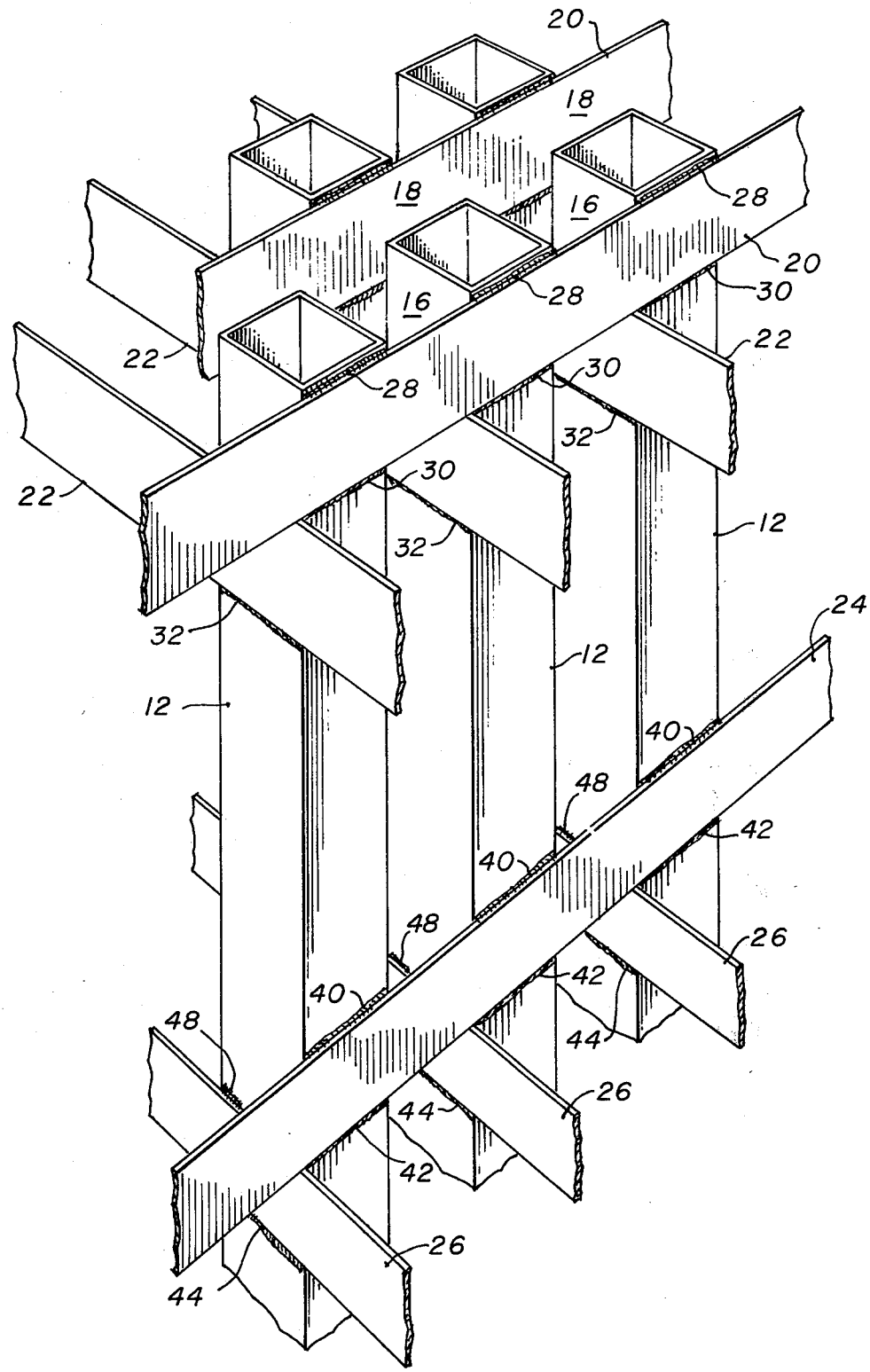
FIG. 1 is an isometric view of the invention.

The present invention is generally illustrated in FIG. 1 which discloses a storage array for storage of nuclear fuel assemblies underwater in a fuel storage pool. Such storage pools are for the purpose of storing new nuclear reactor fuel or spent nuclear reactor fuel. Spent fuel is highly radioactive and generates considerable amounts of decay heat. Consequently, it is necesssary to continuously cool the spent fuel in order to remove the decay heat. The usual means for dissipating the decay heat is to circulate water along the length of the fuel assembly thereby removing the heat through the mechanism's conduction and convection. The heated water may subsequently be removed from the spent fuel storage pool and cooled in an external heat exchanger. The fuel storage rack of the invention consists of a plurality of discrete neutron absorbing containers 12 within which the fuel assemblies are deposited for storage. In the preferred embodiment these containers 12 have polygonal lateral cross-sections which closely match the polygonal cross-sections of the nuclear fuel assemblies (usually square). The containers 12 are open ended tubes having lengths at least equal to or greater than the lengths of the active regions of the fuel assemblies to be stored. Each discrete neutron absorbing container 12 may be constructed by extruding a square metal tube of proper thickness or by welding two L-shaped elongated metal plates of proper thickness. The metal material is preferably one which has a relatively high neutron absorption cross-section such as stainless steel. In the alternative it can be made from a material of low neutron absorption cross-section to which is fastened or which includes a high cross-section material such as boron, cadmium, or gadolinium. In this invention, a square stainless steel container is used with a thickness ranging from 0.508 to 1.27 centimeters with a preferred thickness of 0.635 centimeters. In order to facilitate the deposit of the fuel assemblies in these discrete cosely fitting containers, the walls of the containers may be outwardly flared at one end. It should be recognized that while the preferred orientation of the discrete neutron absorbing containers is up and down, it is nevertheless possible to construct a storage rack which has its storage containers in an orientation other than vertical.

In the preferred embodiment a multiplicity of the discrete neutron absorbing containers are arranged into an array of rows and columns so that there are spaces 16 and 18 between the rows and the columns. The combination of the neutron absorbing shields and the spaces which become filled with water creates a neutron flux trap which permits the closer spacing of fissionable means than would otherwise be possible. According to the preferred embodiment illustrated in FIGS. 1, 2, 3 and 4 the discrete neutron absorbing shields 12 are maintained in a space array by a structural grid consisting of structural members 20, 22, 24 and 26. As can be seen best in FIG. 4 and FIG. 1, a first series of structural members 20 are arranged in parallel spaced array. At a different elevation, a second series of spaced parallel structural members 22 are arranged in spaced parallel array crossing the first series of structural members 20 at an angle equivalent to 90°. Viewing the configuration from a plan view, as in FIG. 4, it can be seen that rectangular channels are formed by the first and second series of structural members. Neutron absorbing shields 12 are then inserted into the passages formed by the first and second series of structural members 20 and 22. Each of the discrete neutron absorbing shields 12 are displaced into a corner of the passages formed by the first and second series of structural members thereby creating the spacing gaps 18 and 16 previously described. The discrete neutron absorbing shields 12 are each rigidly fastened to one member of the first series of structural members 20 and to one member of the second series of structural members 22. This rigid fastening preferably takes the form of welds 28 and 30 between the neutron absorbing shields 12 and member 20 and welds 46 and 32 between the neutron absorbing shields 12 and the structural member 22. It should be recognized that additional welds (not shown) may be vertically made between the corners of the vertically oriented discrete neutron absorbing shields 12 and the sides of structural members 20 and 22. It should also be recognized that the structural members could be bands of metal as shown in the figures, or may be of any other suitable shape such as angle-irons or U-shaped channels.

Figure 2:
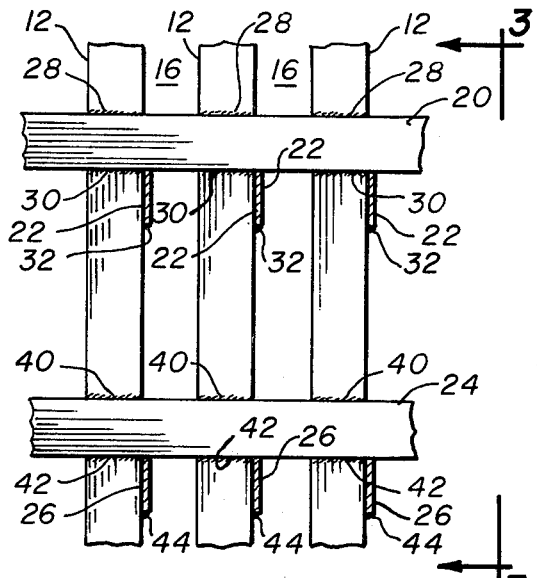
FIG. 2 is a side elevation view of the apparatus shown in FIG. 1.
Figure 3:
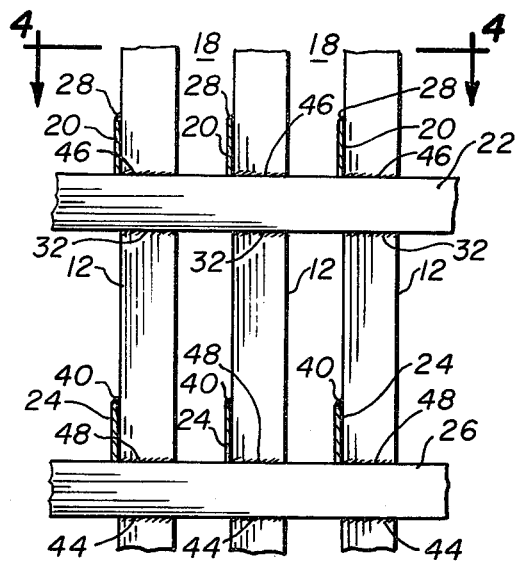
FIG. 3 is another side elevation view of the apparatus shown in FIG. 1 as viewed along the line 3—3 of FIG. 2.
Figure 5:
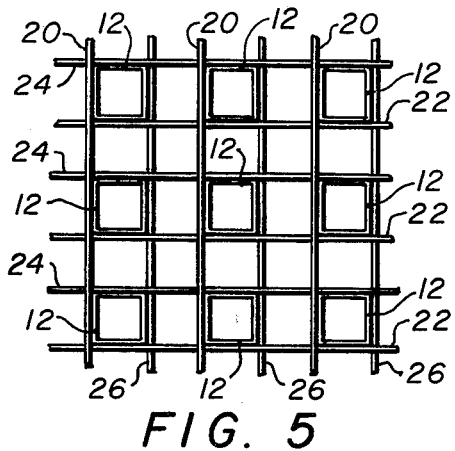
FIG. 5 is a plan view of an alternate embodiment of the apparatus shown in FIG. 1.
Figure 4:
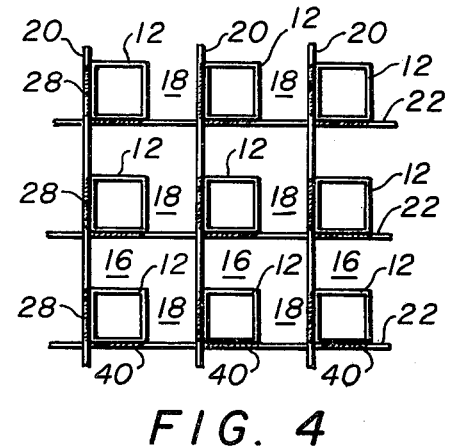
FIG. 4 is a plan view of the apparatus shown in FIG. 1.

A third and fourth series of structural members 24 and 26 may also be arranged in a similar manner at lower elevations. These third and fourth structural members 24 and 26 are best seen in FIGS. 2 and 3 and are fastened in a similar manner to discrete neutron absorbing shields 12 by welds 40, 42, 44 and 48. FIG. 5 shows another variation of the storage array in which the lower structural members 24 and 26 do not lie directly under the upper structural members 20 and 22 but are displaced to form a second grid which permits the fastening of the discrete neutron absorbing containers 12 to the lower structural members 24 and 26 on sides opposite to those sides of the containers 12 previously used for fastening the structural members 20 and 22.

Figure 6:
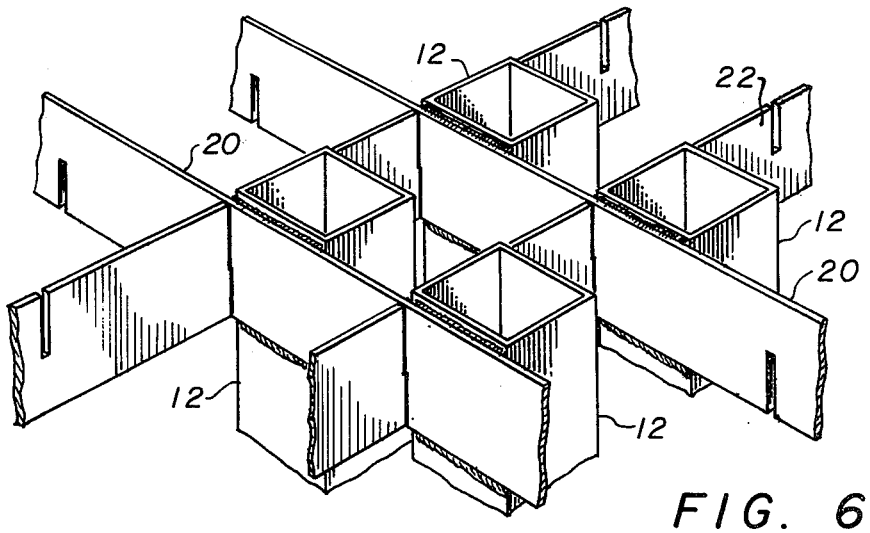
FIG. 6 is an isometric view of an alternate embodiment of the invention wherein the series of bands intersect one another.

FIG. 6 shows a variation of the invention in which the structural members 20 and 22 are not at different elevations but are at the same elevation. This is accomplished in a well known manner by notching or cutting each of the structural members 22 halfway down from the top and each of the structural members 20 halfway up from the bottom and then interfitting the structural members 20 and 22 by engaging and sliding the members together to occupy the same elevational length.

By means of the structures previously described and illustrated in FIGS. 1 – 6 a storage array is created which holds the discrete containers apart by at least a predetermined neutron attenuation distance (16, 18). This minimum predetermined neutron attentuation distance is herein defined as the distance which is precalculated to assure that the array of stored fuel assemblies can not achieve a critical mass. To better understand this concept it is instructive to consider a neutron as it passes from one fuel assembly to the next. While passing from one fuel assembly to the next adjacent fuel assembly, the neutron must pass sequentially through a very small water gap, a stainless steel plate which is one wall of the discrete neutron absorbing container 12, a gap 16 or 18 filled with a moderator such as water or borated water, and a second stainless steel plate which is a portion of the next adjacent discrete neutron absorbing container 12 which surrounds the next adjacent fuel assembly. It is also possible that the neutron may be reflected in gap 16 or 18 and may return to the first steel plate of container 12. During its passage through these four mediums, the typical neutron behaves as follows: On encountering the first stainless steel plate, the typical neutron is a "fast" neutron emanating from the fuel and has such a high energy that it passes through this first neutron absorbing material essentially unaffected and unabsorbed. During its passage through the adjacent water gap 16 or 18, the typical neutron is moderated by the water from high energy to a lower energy to become a "slow" or low energy neutron. And finally, upon encountering the second stainless steel plate or upon reencountering the first stainless steel plate after reflection in water gap 16 or 18, the neutron is absorbed, since the neutron has been moderated to an energy which permits the absorption of the neutron by the neutron absorbing material. It is essential to keep the "very small water gap" between the fuel assembly and its enclosing container to a minimum for two reasons; first, to minimize the possibility of the displacement of the enclosed fuel assembly from its preferred central position; and second, to avoid the situation in which the neutron is moderated to low energy and is subsequently reflected by either the water moderator or by the neutron absorbing material of the enclosing discrete container. It can be shown that increasing the width of the water gap immediately adjacent to the stored fuel assembly increases the probability of this reflection which has the effect of increasing the reactivity of stored fuel assemblies; an undesirable result. Accordingly, this interior gap should in no case be allowed to exceed 1.5 centimeters and the dimension of the gap 16 or 18 is calculated by assuming the interior gap to be 0.

The arrangement of adjacent fuel assemblies surrounded by discrete neutron absorbing containers is a "neutron flux trap" in which any neutron which is traveling from one fuel assembly through a moderator to another fuel assembly or back to the original fuel assembly is sequentially exposed to a moderating material and the trapping material. It is primarily due to this flux trap principle utilized by the invention that the storage density of spent fuel assemblies can be substantially increased. The dimensions involved, particularly the neutron attenuation distance through the water gap between adjacent discrete neutron absorbing containers 12, depends upon a number of factors, including the identity of the fissionable material, the fuel enrichment of the stored fuel assembly, and the thickness of the neutron absorbing material as well as the identity of the neutron absorbing material. In the preferred embodiment, the minimum predetermined neutron attenuation distance is 9.5 centimeters.

What is claimed is:

1. An apparatus for the safe yet compact storage of a plurality of fissionable masses of uniform size and shape, said fissionable masses having lateral cross-sections which fit within the confines of a polygon, wherein the apparatus comprising:
    a. a first series of structural members aligned in spaced parallel rows;
    b. a second series of structural members aligned in spaced parallel rows, said second series of members crossing said first series of members at an angle equal to the angle between two non-parallel sides of said polygon, said first and second series of spaced crossed members forming a plurality of passages transverse to said first and second series of members; and
    c. a plurality of discrete neutron absorbing shields, each one of which is adapted to perimetrically encircle one of said plurality of fissionable masses, each of said discrete neutron absorbing shields being positioned in one of said plurality of passages and being rigidly fastened to one member of said first series of members and one member of said second series of members.

2. The apparatus as recited in claim 1 wherein said first series of structural members is at a first elevation and said second series of structural members is at a second elevation.

3. The apparatus as recited in claim 2 further including:
    a. a third series of structural members aligned in spaced parallel rows at a third elevation and fastened to said discrete neutron absorbing shields; and
    b. a fourth series of structural members crossing said third series of structural members and aligned in spaced parallel rows at a fourth elevation, said fourth series of structural members fastened to said discrete neutron absorbing shields.

4. The apparatus as recited in claim 3 wherein said third and fourth series of structural members are positioned at one end of said plurality of discrete neutron absorbing shields and said first and second series of structural members are positioned at the opposite end of said plurality of discrete neutron absorbing shields.

5. The apparatus as recited in claim 1 wherein said first and second series of structural members are welded to said discrete neutron absorbing shields.

6. The apparatus as recited in claim 1 wherein said first and second series of structural members and said discrete neutron absorbing shields are stainless steel.

7. The apparatus as recited in claim 1 wherein said discrete neutron absorbing shields have lateral cross-sections which are square and wherein said angle at which said first series of structural members crosses said second series of structural members is 90° so that said passages formed by said first and second series of structural members are square.

8. The apparatus as recited in claim 2 wherein said first and second series of structural members are welded to said discrete neutron absorbing shields.

9. The apparatus as recited in claim 2 wherein said first and second series of structural members and said discrete neutron absorbing shields are stainless steel.

10. The apparatus as recited in claim 2 wherein said discrete neutron absorbing shields have lateral cross-sections which are square and wherein said angle at which said first series of bands crosses said second series of structural members is 90° so that said passages formed by said first and second series of structural members are square.

11. The apparatus as recited in claim 1 wherein the spacing between adjacent members of the first series of structural members and the spacing between adjacent members of the second series of structural members are not smaller than a diameter of one of said discrete neutron absorbing shields plus a minimum neutron attenuation distance.

12. The apparatus as recited in claim 2 wherein the spacing between adjacent members of the first series of structural members and the spacing between adjacent members of the second series of structural members are not smaller than a diameter of one of said discrete neutron absorbing shields plus a minimum neutron attenuation distance.

13. The apparatus as recited in claim 1 wherein said members of said first series each have a plurality of cuts therein and said members of said second series each have a plurality of cuts therein and said apparatus is assembled by inserting said first series of members into said cuts of said second series and by inserting said second series of members into said cuts of said first series.

* * * * *